United States Patent
Saeger et al.

(10) Patent No.: US 9,821,620 B2
(45) Date of Patent: Nov. 21, 2017

(54) METHOD FOR OPERATING A TILTING RUNNING GEAR AND AN ACTIVE TILTING RUNNING GEAR FOR A NON-RAIL-BORNE VEHICLE

(71) Applicant: FORD GLOBAL TECHNOLOGIES, LLC, Dearborn, MI (US)

(72) Inventors: Martin Saeger, Pulheim (DE); Marc Simon, Köln (DE); Advait Valluri, Aachen (DE)

(73) Assignee: FORD TECHNOLOGIES CORPORATION, Dearborn, MI (US)

( * ) Notice: Subject to any disclaimer, the term of this patent is extended or adjusted under 35 U.S.C. 154(b) by 0 days.

(21) Appl. No.: 14/842,099

(22) Filed: Sep. 1, 2015

(65) Prior Publication Data
US 2016/0059661 A1 Mar. 3, 2016

(30) Foreign Application Priority Data
Sep. 1, 2014 (DE) .................. 10 2014 217 386

(51) Int. Cl.
*B60G 17/016* (2006.01)
*G05D 1/08* (2006.01)

(52) U.S. Cl.
CPC ..... *B60G 17/0164* (2013.01); *B60G 17/0162* (2013.01); *G05D 1/0891* (2013.01); *B60G 2300/45* (2013.01); *G05D 2201/0213* (2013.01)

(58) Field of Classification Search
USPC .......................................... 701/38
See application file for complete search history.

(56) References Cited

U.S. PATENT DOCUMENTS

| 2,186,065 A | 1/1940 | Fischer |
| 2,353,503 A | 7/1944 | Rost et al. |
| 2,474,471 A | 6/1949 | Dolan |
| 3,309,097 A | 3/1967 | Fritz |

(Continued)

FOREIGN PATENT DOCUMENTS

| CN | 1918013 A | 2/2007 |
| DE | 679966 C | 8/1939 |

(Continued)

OTHER PUBLICATIONS

Machine translation of German Examination Report dated May 28, 2015 for German Application No. 102014217386.8.

(Continued)

*Primary Examiner* — Bhavesh V Amin
(74) *Attorney, Agent, or Firm* — Jones Robb, PLLC; Raymond L. Coppiellie

(57) ABSTRACT

A method of operating a tilting running gear for a non-rail-borne vehicle having at least one actuator is disclosed. The method includes calculating an angle of tilt of the vehicle around an axis of rotation based on prevailing values of centrifugal acceleration and gravitational acceleration as the vehicle enters a curve. Based on a comparison between an actual lateral acceleration of the vehicle and a desired lateral acceleration of the vehicle, the vehicle is accelerated or decelerated to achieve the calculated angle of tilt. When the calculated angle of tilt has been achieved, the actuator is deactivated. The actuator provides acceleration of the vehicle and a braking device provides deceleration of the vehicle.

18 Claims, 3 Drawing Sheets

(56) References Cited

U.S. PATENT DOCUMENTS

| | | |
|---|---|---|
| 3,417,985 A | 12/1968 | Hannan |
| 3,558,123 A | 1/1971 | Yew |
| 3,572,456 A | 3/1971 | Healy |
| 3,589,700 A | 6/1971 | Ruet |
| 3,733,087 A | 5/1973 | Allison |
| 3,990,725 A | 11/1976 | Allison |
| 3,992,036 A | 11/1976 | Allison |
| 4,273,357 A | 6/1981 | Pashkow |
| 4,351,410 A | 9/1982 | Townsend |
| 4,375,293 A | 3/1983 | Solbes |
| 4,458,918 A | 7/1984 | Rumpel |
| 4,614,359 A | 9/1986 | Lundin |
| 4,632,413 A | 12/1986 | Fujita et al. |
| 4,657,271 A | 4/1987 | Salmon |
| 4,659,106 A | 4/1987 | Fujita et al. |
| 4,685,690 A | 8/1987 | Fujita et al. |
| 4,779,893 A | 10/1988 | Juechter |
| 4,887,829 A | 12/1989 | Prince |
| 5,040,812 A | 8/1991 | Patin |
| 5,040,823 A | 8/1991 | Lund |
| 5,069,476 A | 12/1991 | Tsutsumi et al. |
| 5,116,069 A | 5/1992 | Miller |
| 5,161,425 A | 11/1992 | Baskett et al. |
| 5,161,822 A | 11/1992 | Lund |
| 5,207,451 A | 5/1993 | Furuse et al. |
| 5,324,056 A | 6/1994 | Orton |
| 5,337,847 A | 8/1994 | Woods et al. |
| 5,347,457 A | 9/1994 | Tanaka et al. |
| 5,445,443 A * | 8/1995 | Hauser ............ B60T 8/1706 303/137 |
| 5,580,089 A | 12/1996 | Kolka |
| 5,611,555 A | 3/1997 | Vidal |
| 5,762,351 A | 6/1998 | SooHoo |
| 5,765,115 A | 6/1998 | Ivan |
| 5,765,846 A | 6/1998 | Braun |
| 5,772,224 A | 6/1998 | Tong |
| 5,791,425 A | 8/1998 | Kamen et al. |
| 5,825,284 A | 10/1998 | Dunwoody et al. |
| 5,839,082 A | 11/1998 | Iwasaki |
| 5,927,424 A * | 7/1999 | Van Den Brink ....... B60G 9/02 180/216 |
| 6,026,920 A | 2/2000 | Obeda et al. |
| 6,116,618 A | 9/2000 | Shono et al. |
| 6,142,494 A | 11/2000 | Higuchi |
| 6,149,226 A | 11/2000 | Hoelzel |
| 6,213,561 B1 | 4/2001 | Witthaus |
| 6,250,649 B1 * | 6/2001 | Braun ............. B60G 17/0162 280/124.106 |
| 6,311,795 B1 | 11/2001 | Skotnikov |
| 6,328,125 B1 | 12/2001 | Van Den Brink et al. |
| 6,367,824 B1 | 4/2002 | Hayashi |
| 6,390,505 B1 | 5/2002 | Wilson |
| 6,425,585 B1 * | 7/2002 | Schuelke .......... B60G 17/0162 280/124.106 |
| 6,435,522 B1 | 8/2002 | Van Den Brink et al. |
| 6,446,980 B1 | 9/2002 | Kutscher et al. |
| 6,454,035 B1 | 9/2002 | Waskow et al. |
| 6,460,835 B1 | 10/2002 | Hamano et al. |
| 6,467,783 B1 | 10/2002 | Blondelet et al. |
| 6,511,078 B2 * | 1/2003 | Sebe ................ B60G 3/01 280/124.103 |
| 6,554,293 B1 * | 4/2003 | Fennel .............. B60T 8/1708 280/5.502 |
| 6,564,129 B2 * | 5/2003 | Badenoch ......... B60G 17/0162 280/5.502 |
| 6,637,758 B2 | 10/2003 | Woo |
| 6,654,674 B2 * | 11/2003 | Lu ................. B60T 8/1755 701/36 |
| 6,697,726 B2 * | 2/2004 | Takagi ............ B60T 8/17554 280/5.501 |
| 6,702,265 B1 | 3/2004 | Zapletal |
| 6,722,676 B2 | 4/2004 | Zadok |
| 6,725,135 B2 * | 4/2004 | McKeown ......... B60R 16/0233 180/282 |
| 6,805,362 B1 * | 10/2004 | Melcher ............ B60G 7/006 280/5.52 |
| 6,817,617 B2 | 11/2004 | Hayashi |
| 7,066,474 B2 | 6/2006 | Hiebert et al. |
| 7,073,806 B2 | 7/2006 | Bagnoli |
| 7,097,187 B2 | 8/2006 | Walters et al. |
| 7,131,650 B2 | 11/2006 | Melcher |
| 7,229,086 B1 | 6/2007 | Rogers |
| 7,343,997 B1 | 3/2008 | Matthies |
| 7,389,592 B2 | 6/2008 | Tsuruta et al. |
| 7,487,985 B1 | 2/2009 | Mighell |
| 7,568,541 B2 | 8/2009 | Pfeil et al. |
| 7,571,787 B2 | 8/2009 | Saiki |
| 7,591,337 B2 | 9/2009 | Suhre et al. |
| 7,607,695 B2 | 10/2009 | Moulene |
| 7,631,721 B2 | 12/2009 | Hobbs |
| 7,640,086 B2 * | 12/2009 | Nakashima ............ B62K 3/00 180/6.5 |
| 7,641,207 B2 | 1/2010 | Yang |
| 7,648,148 B1 | 1/2010 | Mercier |
| 7,665,742 B2 | 2/2010 | Haerr et al. |
| 7,673,883 B2 | 3/2010 | Damm |
| 7,731,210 B2 | 6/2010 | Pedersen |
| 7,887,070 B2 | 2/2011 | Kirchner |
| 7,896,360 B2 | 3/2011 | Buma |
| 7,914,020 B2 | 3/2011 | Boston |
| 7,946,596 B2 | 5/2011 | Hsu et al. |
| 7,967,306 B2 | 6/2011 | Mighell |
| 8,016,302 B1 | 9/2011 | Reeve |
| 8,050,820 B2 | 11/2011 | Yanaka et al. |
| 8,070,172 B1 | 12/2011 | Smith et al. |
| 8,104,781 B2 | 1/2012 | Gazarek |
| 8,260,504 B2 | 9/2012 | Tsujii et al. |
| 8,262,111 B2 | 9/2012 | Lucas |
| 8,345,096 B2 | 1/2013 | Ishiyama et al. |
| 8,641,064 B2 | 2/2014 | Krajekian |
| 8,651,503 B2 | 2/2014 | Rhodig |
| 8,818,700 B2 * | 8/2014 | Moulene ............ G05D 1/0891 180/199 |
| 8,925,940 B2 | 1/2015 | Mighell |
| 9,045,015 B2 | 6/2015 | Spahl et al. |
| 9,090,281 B2 * | 7/2015 | Spahl ................. B62D 9/02 |
| 9,145,168 B2 | 9/2015 | Spahl et al. |
| 9,216,763 B2 | 12/2015 | Huntzinger |
| 9,248,857 B2 | 2/2016 | Spahl et al. |
| 9,283,989 B2 | 3/2016 | Spahl et al. |
| 9,296,420 B2 | 3/2016 | Sasaki et al. |
| 9,493,208 B2 | 11/2016 | Sasaki et al. |
| 2001/0028154 A1 | 10/2001 | Sebe |
| 2002/0109310 A1 * | 8/2002 | Lim ................. B60G 15/067 280/5.508 |
| 2002/0171216 A1 | 11/2002 | Deal |
| 2002/0190494 A1 | 12/2002 | Cocco |
| 2003/0071430 A1 | 4/2003 | Serra et al. |
| 2003/0102176 A1 | 6/2003 | Bautista |
| 2003/0141689 A1 | 7/2003 | Hamy |
| 2003/0197337 A1 | 10/2003 | Dodd et al. |
| 2004/0051262 A1 | 3/2004 | Young |
| 2004/0100059 A1 | 5/2004 | Van Den Brink |
| 2004/0134302 A1 | 7/2004 | Ko et al. |
| 2004/0199314 A1 * | 10/2004 | Meyers ............. B62D 6/00 701/38 |
| 2004/0236486 A1 | 11/2004 | Krause et al. |
| 2005/0051276 A1 | 3/2005 | Blondelet et al. |
| 2005/0082771 A1 | 4/2005 | Oh |
| 2005/0127656 A1 | 6/2005 | Sato et al. |
| 2005/0184476 A1 | 8/2005 | Hamm |
| 2005/0199087 A1 | 9/2005 | Li et al. |
| 2005/0206101 A1 | 9/2005 | Bouton |
| 2005/0275181 A1 | 12/2005 | MacIsaac |
| 2006/0049599 A1 | 3/2006 | Lehane |
| 2006/0091636 A1 | 5/2006 | Shelton |
| 2006/0151982 A1 | 7/2006 | Mills |
| 2006/0170171 A1 | 8/2006 | Pedersen |
| 2006/0180372 A1 | 8/2006 | Mercier et al. |
| 2006/0220331 A1 | 10/2006 | Schafer et al. |
| 2006/0226611 A1 | 10/2006 | Xiao et al. |
| 2006/0249919 A1 * | 11/2006 | Suzuki ............ B60G 17/0162 280/5.511 |

(56) References Cited

U.S. PATENT DOCUMENTS

| | | | |
|---|---|---|---|
| 2006/0276944 A1* | 12/2006 | Yasui | B60T 8/172 |
| | | | 701/37 |
| 2007/0029751 A1 | 2/2007 | Marcacci | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182110 A1 | 8/2007 | Urababa | |
| 2007/0182120 A1 | 8/2007 | Tonoli et al. | |
| 2007/0193803 A1* | 8/2007 | Geiser | B60G 17/01908 |
| | | | 180/215 |
| 2007/0193815 A1 | 8/2007 | Hobbs | |
| 2007/0228675 A1* | 10/2007 | Tonoli | B60G 17/015 |
| | | | 280/5.506 |
| 2007/0241522 A1 | 10/2007 | Tsai | |
| 2008/0001377 A1 | 1/2008 | Rogic | |
| 2008/0012262 A1 | 1/2008 | Carabelli et al. | |
| 2008/0033612 A1 | 2/2008 | Raab | |
| 2008/0100018 A1 | 5/2008 | Dieziger | |
| 2008/0114509 A1 | 5/2008 | Inoue et al. | |
| 2008/0115994 A1 | 5/2008 | Martini | |
| 2008/0135320 A1 | 6/2008 | Matthies | |
| 2008/0164085 A1 | 7/2008 | Cecinini | |
| 2008/0197597 A1* | 8/2008 | Moulene | B60G 21/007 |
| | | | 280/124.103 |
| 2008/0197599 A1 | 8/2008 | Comstock et al. | |
| 2008/0223634 A1* | 9/2008 | Yamamoto | B60K 6/52 |
| | | | 180/65.285 |
| 2008/0227365 A1* | 9/2008 | Lo | A63H 17/21 |
| | | | 446/440 |
| 2008/0238005 A1 | 10/2008 | James | |
| 2008/0255726 A1 | 10/2008 | Fischlein et al. | |
| 2008/0258416 A1 | 10/2008 | Wilcox | |
| 2008/0272562 A1 | 11/2008 | Sabelstrom et al. | |
| 2009/0026719 A1 | 1/2009 | Koch et al. | |
| 2009/0085311 A1 | 4/2009 | Kim et al. | |
| 2009/0105906 A1 | 4/2009 | Hackney et al. | |
| 2009/0108555 A1 | 4/2009 | Wilcox | |
| 2009/0171530 A1 | 7/2009 | Bousfield | |
| 2009/0194961 A1 | 8/2009 | Dieziger | |
| 2009/0194965 A1 | 8/2009 | Boston | |
| 2009/0197731 A1 | 8/2009 | Kobler | |
| 2009/0289437 A1 | 11/2009 | Steinhilber | |
| 2009/0299565 A1 | 12/2009 | Hara et al. | |
| 2009/0312908 A1* | 12/2009 | Van Den Brink | B62D 9/02 |
| | | | 701/38 |
| 2009/0314566 A1 | 12/2009 | Rust | |
| 2009/0315282 A1 | 12/2009 | Kirchner | |
| 2010/0025944 A1 | 2/2010 | Hara et al. | |
| 2010/0030441 A1* | 2/2010 | Kosaka | G05D 1/0891 |
| | | | 701/70 |
| 2010/0032914 A1 | 2/2010 | Hara et al. | |
| 2010/0032915 A1 | 2/2010 | Hsu et al. | |
| 2010/0044977 A1 | 2/2010 | Hughes et al. | |
| 2010/0044979 A1 | 2/2010 | Haeusler et al. | |
| 2010/0152987 A1 | 6/2010 | Gorai | |
| 2010/0219600 A1 | 9/2010 | Dada | |
| 2011/0006498 A1 | 1/2011 | Mercier | |
| 2011/0095494 A1 | 4/2011 | White | |
| 2011/0148052 A1 | 6/2011 | Quemere | |
| 2011/0215544 A1 | 9/2011 | Rhodig | |
| 2011/0254238 A1 | 10/2011 | Kanou | |
| 2012/0098225 A1 | 4/2012 | Lucas | |
| 2012/0248717 A1 | 10/2012 | Tsujii et al. | |
| 2013/0062133 A1 | 3/2013 | Budweil | |
| 2013/0068550 A1 | 3/2013 | Gale | |
| 2013/0127131 A1 | 5/2013 | Michel | |
| 2013/0153311 A1 | 6/2013 | Huntzinger | |
| 2013/0168934 A1 | 7/2013 | Krajekian | |
| 2014/0252730 A1 | 9/2014 | Spahl et al. | |
| 2014/0252731 A1 | 9/2014 | Spahl et al. | |
| 2014/0252732 A1* | 9/2014 | Spahl | B62D 9/02 |
| | | | 280/5.5 |
| 2014/0252733 A1 | 9/2014 | Spahl et al. | |
| 2014/0252734 A1 | 9/2014 | Spahl et al. | |
| 2014/0312580 A1* | 10/2014 | Gale | B60G 21/073 |
| | | | 280/5.509 |
| 2014/0346753 A1 | 11/2014 | Huang et al. | |
| 2014/0353937 A1 | 12/2014 | Girelli Consolaro | |
| 2014/0365078 A1* | 12/2014 | Gerecke | B62D 6/003 |
| | | | 701/41 |
| 2015/0045171 A1 | 2/2015 | Schimpf et al. | |
| 2015/0094909 A1 | 4/2015 | Illg | |
| 2016/0009180 A1* | 1/2016 | Barrass | B66F 9/24 |
| | | | 701/22 |
| 2016/0059923 A1 | 3/2016 | Simon et al. | |
| 2016/0144680 A1 | 5/2016 | Simon et al. | |
| 2016/0243918 A1 | 8/2016 | Spahl et al. | |
| 2016/0244094 A1 | 8/2016 | Spahl et al. | |

FOREIGN PATENT DOCUMENTS

| | | |
|---|---|---|
| DE | 1937578 U | 1/1963 |
| DE | 6801096 U | 11/1967 |
| DE | 4035128 A1 | 6/1992 |
| DE | 4135585 A1 | 5/1993 |
| DE | 4236328 C1 | 9/1993 |
| DE | 4315017 C1 | 9/1994 |
| DE | 19621947 C1 | 10/1997 |
| DE | 19735912 A1 | 3/1998 |
| DE | 19717418 C1 | 10/1998 |
| DE | 19800292 A1 | 6/1999 |
| DE | 19848294 A1 | 10/1999 |
| DE | 19838328 C1 | 12/1999 |
| DE | 19846275 A1 | 12/1999 |
| DE | 19831162 A1 | 7/2000 |
| DE | 10251946 B3 | 3/2004 |
| DE | 10349655 A1 | 6/2005 |
| DE | 102004027202 A1 | 10/2005 |
| DE | 102004058523 A1 | 6/2006 |
| DE | 102007006546 A1 | 8/2007 |
| DE | 112006002581 T5 | 9/2008 |
| DE | 102007024769 A1 | 11/2008 |
| DE | 102008046588 A1 | 3/2010 |
| DE | 102009042662 A1 | 3/2011 |
| DE | 102010000884 A1 | 7/2011 |
| DE | 102010000886 A1 | 7/2011 |
| DE | 102010055947 A1 | 8/2011 |
| DE | 102010041404 A1 | 3/2012 |
| DE | 102010046317 A1 | 3/2012 |
| DE | 102012217416 A1 | 3/2014 |
| EP | 0592377 A1 | 4/1994 |
| EP | 0606191 A1 | 7/1994 |
| EP | 0626307 A1 | 11/1994 |
| EP | 0658453 A2 | 6/1995 |
| EP | 1030790 A1 | 8/2000 |
| EP | 1142779 A2 | 10/2001 |
| EP | 1153773 A2 | 11/2001 |
| EP | 1155950 A2 | 11/2001 |
| EP | 1180476 A1 | 2/2002 |
| EP | 1228905 A2 | 8/2002 |
| EP | 1346907 A2 | 9/2003 |
| EP | 1348617 A1 | 10/2003 |
| EP | 1419909 A2 | 5/2004 |
| EP | 1539563 A1 | 6/2005 |
| EP | 1600313 A1 | 11/2005 |
| EP | 1630081 A1 | 3/2006 |
| EP | 1702773 A2 | 9/2006 |
| EP | 1798081 A1 | 6/2007 |
| EP | 1872981 A1 | 1/2008 |
| EP | 1773609 B1 | 3/2008 |
| EP | 1944228 A1 | 7/2008 |
| EP | 2030814 A2 | 3/2009 |
| EP | 2077223 A1 | 7/2009 |
| EP | 2199122 A1 | 6/2010 |
| EP | 2213561 A1 | 8/2010 |
| EP | 2475570 B1 | 7/2012 |
| EP | 2712796 A2 | 4/2014 |
| ES | 2284383 A1 | 1/2007 |
| FR | 2663283 A1 | 12/1991 |
| FR | 2768203 A1 | 3/1999 |
| FR | 2858963 A1 | 2/2005 |
| FR | 2872699 A1 | 1/2006 |

(56) References Cited

FOREIGN PATENT DOCUMENTS

| | | |
|---|---|---|
| FR | 2927026 A1 | 8/2009 |
| FR | 2937000 A1 | 4/2010 |
| FR | 2946944 A1 | 12/2010 |
| FR | 2961746 A1 | 12/2011 |
| GB | 480191 A | 2/1938 |
| GB | 1157016 A | 7/1969 |
| GB | 2322837 A | 9/1998 |
| GB | 2382334 A | 11/2001 |
| GB | 2374327 A | 10/2002 |
| GB | 2390065 A | 12/2003 |
| GB | 2394701 A | 5/2004 |
| GB | 2444250 A | 6/2008 |
| GB | 2450740 A | 1/2009 |
| GB | 2472180 A | 2/2011 |
| GB | 2476877 A | 7/2011 |
| GB | 2492757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006248489 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| JP | 2011230727 A | 11/2011 |
| JP | 2012153349 A | 8/2012 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011005945 A1 | 1/2011 |
| WO | 2011/023862 A1 | 3/2011 |
| WO | 2011029795 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011102108 A1 | 8/2011 |
| WO | 2011/107674 A1 | 9/2011 |
| WO | 2012031150 A2 | 3/2012 |
| WO | 2014009637 A1 | 1/2014 |

OTHER PUBLICATIONS

Machine translation of German Examination Report dated Apr. 30, 2015 for German Application No. 102014217246.2.

Non-Final Office Action dated Jun. 27, 2016 from co-pending U.S. Appl. No. 14/630,070.

Non-Final Office Action dated Jun. 27, 2016 from co-pending U.S. Appl. No. 14/630,106.

Non-Final Office Action dated Aug. 3, 2016 from co-pending U.S. Appl. No. 14/554,410.

Further United Kingdom Search Report for related Application No. GB1520837.4, dated May 4, 2016.

German Search Report for related Application No. 10 2013 203 923.9 dated Oct. 8, 2013.

German Search Report for related Application No. 10 2013 203 922.0 dated Oct. 14, 2013.

German Search Report for related Application No. 10 2013 203 927.1 dated Nov. 5, 2013.

German Search Report for related Application No. 10 2013 203 926.3 dated Oct. 31, 2013.

German Search Report for related Application No. 10 2013 203 924.7 dated Oct. 24, 2013.

United Kingdom Search Report for related Application No. GB1520837.4, dated Apr. 13, 2016.

Office Action from co-pending U.S. Appl. No. 14/544,410.

Office Action dated Nov. 28, 2014 for patented U.S. Appl. No. 14/201,550.

Office Action dated Oct. 10, 2014 for patented U.S. Appl. No. 14/201,602.

Office Action dated Sep. 4, 2014 for co-pending U.S. Appl. No. 14/201,628.

Office Action dated Dec. 26, 2014 for co-pending U.S. Appl. No. 14/201,628.

Office Action dated Mar. 11, 2015 for co-pending U.S. Appl. No. 14/201,628.

Office Action dated Jan. 29, 2015 for patented U.S. Appl. No. 14/201,616.

Office Action dated Dec. 19, 2014 for patented U.S. Appl. No. 14/201,586.

Office Action dated Jun. 1, 2015 for patented U.S. Appl. No. 14/201,586.

Office Action dated Jul. 28, 2015 for co-pending U.S. Appl. No. 14/201,628.

Notice of Allowance dated Mar. 19, 2015 for patented U.S. Appl. No. 14/201,550.

Notice of Allowance dated Sep. 28, 2015 for patented U.S. Appl. No. 14/201,586.

Notice of Allowance dated Feb. 3, 2015 for patented U.S. Appl. No. 14/201,602.

Notice of Allowance dated May 20, 2015 for patented U.S. Appl. No. 14/201,616.

Advisory Action dated Oct. 7, 2015 for co-pending U.S. Appl. No. 14/201,628.

Notice of Allowance dated Nov. 3, 2015 for co-pending U.S. Appl. No. 14/201,628.

Office Action dated Nov. 6, 2015 for co-pending U.S. Appl. No. 14/554,410.

Notice of Allowance dated Jan. 27, 2017 from co-pending U.S. Appl. No. 14/554,410.

(56) References Cited

OTHER PUBLICATIONS

Non-Final Office Action dated Dec. 19, 2016 from co-pending U.S. Appl. No. 14/839,137.
Final Office Action dated Dec. 30, 2016 from co-pending U.S. Appl. No. 14/630,106.
Chinese Notification of First Office Action for related Application No. CN201410083843.2, dated Mar. 24, 2017.
Chinese Notification of First Office Action for related Application No. CN201410083467.7, dated Mar. 24, 2017.
Advisory Action dated Mar. 27, 2017 from co-pending U.S. Appl. No. 14/630,106.
Advisory Action dated Mar. 29, 2017 from co-pending U.S. Appl. No. 14/630,070.
Chinese Notification of First Office Action for related Application No. CN201410083008.9, dated Apr. 6, 2017.
Non-Final Office Action dated Apr. 27, 2017 from co-pending U.S. Appl. No. 14/630,070.
Non-Final Office Action dated May 5, 2017 from co-pending U.S. Appl. No. 14/630,106.
Chinese Notification of First Office Action for related Application No. CN201410082053.2, dated Apr. 27, 2017.
Chinese Notification of First Office Action for related Application No. CN201410081761.4, dated Mar. 29, 2017.
Notice of Allowance from co-pending U.S. Appl. No. 14/839,137, dated Aug. 21, 2017.

* cited by examiner

METHOD FOR OPERATING A TILTING RUNNING GEAR AND AN ACTIVE TILTING RUNNING GEAR FOR A NON-RAIL-BORNE VEHICLE

CROSS REFERENCE TO RELATED APPLICATIONS

This application claims priority to German Application No. 10 2014 217 386.8, filed on Sep. 1, 2014, the entire content of which is incorporated by reference herein.

Technical Field

The present disclosure relates generally to a method for operating a tilting running gear for a non-rail-borne vehicle having at least one actuator.

Background

Single track vehicles—such as a motorcycle—comprise the characteristic that in curves they require an appropriate lateral tilt in the respective steering direction. A tilting moment is generated by means of the so-called "angle of tilt" of the vehicle in the direction of the curve center point and the tilting moment counteracts the centrifugal force that acts on the vehicle and that increases as the velocity increases. Without this tilt, the vehicle would, so to speak, fall out of the curve.

Future transport scenarios are planning for multi-track vehicles using considerably smaller vehicle concepts in comparison to current private vehicles. A similar stability problem to that experienced in the case of single-track vehicles also arises in the case of multi-track vehicles of this type, in particular, two-track vehicles on an least one axle and having a small track width. In this case, the opposing moment that arises on the basis of the weight force and the track width is no longer sufficient above an individual curve velocity. As a result, the curve-inner wheel of the axle can lose its contact with the ground during a steering maneuver. In this state, when the velocity is above a specific value, the vehicle is likewise in danger of tilting over in the opposite direction to the curve direction and consequently tilting out of the curve.

Therefore, in addition to lowering the center of gravity of the vehicle, vehicles of this type have been equipped with tilting technology, as a result of which the bodies of the vehicles can be tilted into the curves in a similar manner to the body of a motorcycle. The stabilizing process that is possible in this manner, similar to that which has been performed by single-track vehicles, for example, by means of the person steering the vehicle and/or by way of a suitable tilting means. In the case of so-called passive tilting running gear, the suggestions to assume or change the vehicle tilt are limited purely to manual steering inputs and/or to the weight shift of the person. In contrast thereto, active tilting running gear can be directly adjusted by means of the respective tilting means.

Various embodiments for vehicles that are equipped with a tilting running gear are already known in the prior art. Vehicles that are equipped with a tilting running gear are described herein as tilting vehicles.

The control and also activation of active tilting running gear that is equipped with a tilting means—such as by way of example an actuator—represents a number of challenges. In order to detect the driving dynamics of a vehicle that is being driven, it is possible, for example, to use the centrifugal acceleration that occurs in particular in curves or to use the yaw rate. However, the process of detecting driving dynamics is performed only within a vehicle coordinate system that constantly changes with respect to the global coordinate system due to the changing angle of tilt of the vehicle.

The accuracy of these signals can be regarded as sufficient for a vehicle that does not comprise a tilting running gear and that comprises only a small angle for its possible tilt. However, in the case of a vehicle that does comprise a tilting running gear, the measurements that are to be taken are complicated and imprecise and demand, for example, additional information regarding the angle of tilt and the changes of the coordinates. In addition, the actuators that are used occasionally have a higher energy consumption due to the fact that they are constantly providing a force. This applies both during the active engagement with the object of changing the angle of tilt and also during the process of maintaining a previously assumed angle of tilt. This occasionally contradicts the concept of efficiency of smaller and narrower vehicles of this type.

The operation of tilting running gear of this type therefore offers room for improvement with regard to the provision of cost effective and energy efficient control systems for active tilting systems for vehicles.

SUMMARY

In accordance with various exemplary embodiments, the present disclosure provides a method of operating a tilting running gear for a non-rail-borne vehicle having at least one actuator. The method comprises calculating an angle of tilt of the vehicle around an axis of rotation based on prevailing values of centrifugal acceleration and gravitational acceleration as the vehicle enters a curve; and accelerating or decelerating the vehicle to achieve the calculated angle of tilt. Acceleration or deceleration of the vehicle is based at least in part on a comparison between an actual lateral acceleration of the vehicle and a desired lateral acceleration of the vehicle. The method further comprises deactivating the actuator when the calculated angle of tilt has been achieved. The actuator provides acceleration of the vehicle and a braking device provides deceleration of the vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
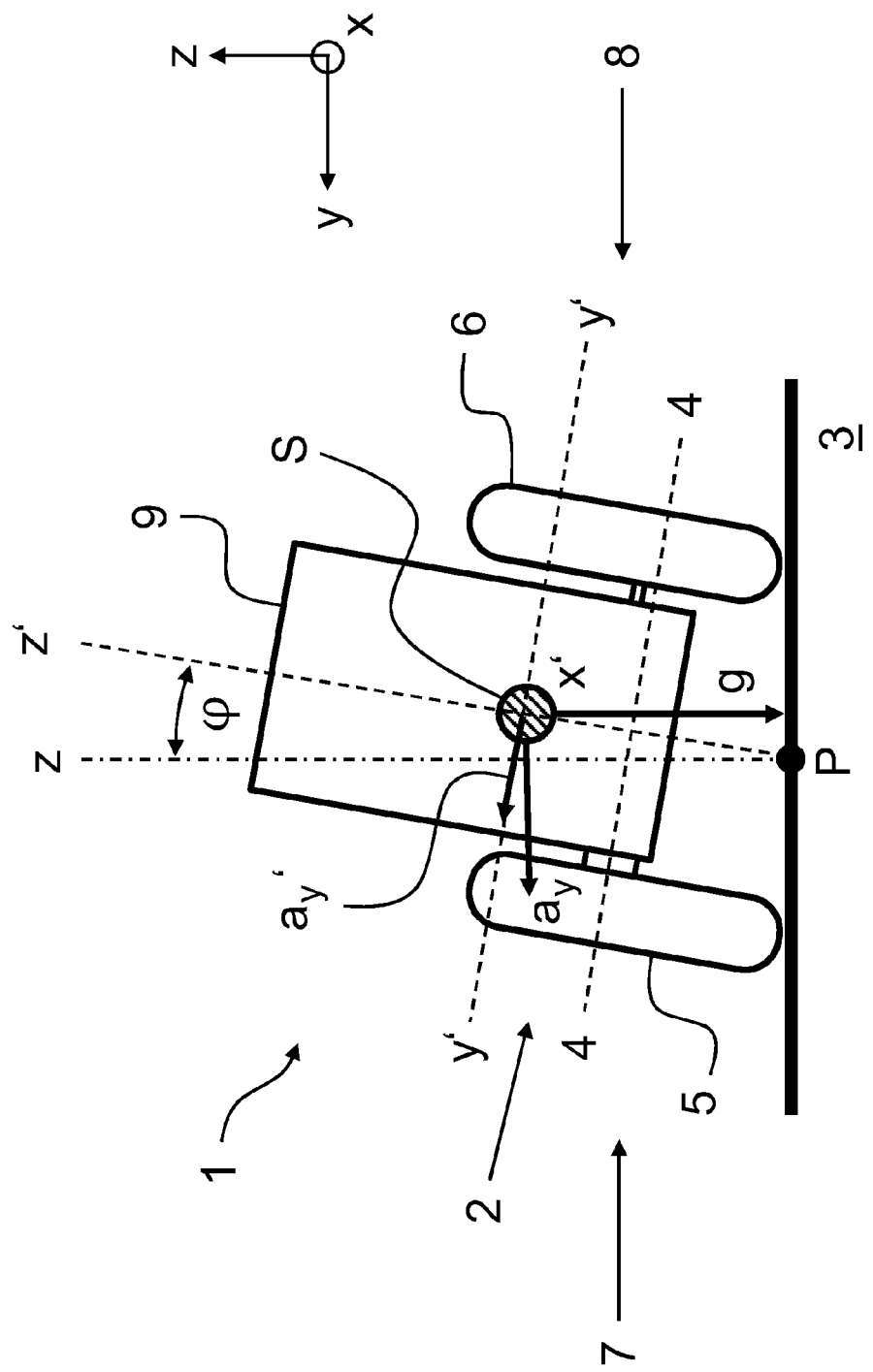
FIG. 1 illustrates a tilted vehicle having a tilting running gear in accordance with the invention with a view in the longitudinal direction of the vehicle.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a description is provided of a method for operating an active tilting running gear that is suitable for a non-rail-borne vehicle.

The tilting running gear comprises at least one tilting which may be an actuator. The actuator is controlled to actively set and also change the respective required angle of tilt of the vehicle about an axis of rotation. The object is to compensate for the centrifugal acceleration that occurs in curves by means of which the vehicle would tilt about the axis of rotation radially out of the curve in the absence of a counter force. The respective high magnitude of centrifugal acceleration depends upon the prevailing velocity of the vehicle and/or its steering angle. In order to achieve the required counter force, the vehicle is actively tilted about the axis of rotation and, consequently, into the respective curve in the opposite direction to the centrifugal acceleration. The angle of tilt is set by means of the actuator in that the actuator generates a corresponding adjusting force.

The person who is controlling the vehicle can likewise make a corresponding contribution, such as a weight shift, in order to achieve the required angle of tilt. As a consequence, the adjusting force that is to be generated by the actuator can be reduced to a prevailing difference between the desired adjusting force and the amount contributed by the person.

In accordance with the present disclosure, the respective angle of tilt is calculated in such a manner that the prevailing values for the centrifugal acceleration and the gravitational acceleration are used as a basis. The respective directions of the acceleration are assumed with regard to a global coordinate system that is independent of the respective angle of tilt of the vehicle. The measured centrifugal acceleration is consequently directed in a horizontal direction whereas the assumed or likewise measured gravitational acceleration is directed in a perpendicular manner thereto in the direction of the ground along which the vehicle is to travel.

It is expedient in this case that both the centrifugal acceleration and also the gravitational acceleration are broken down into components that, in the case of an angle of tilt of the vehicle, are derived from the vehicle's upright position. In other words, the vehicle or its body extends in a dedicated vehicle coordinate system that is tilted in dependence upon the respective angle of tilt with respect to the global coordinate system. In particular, the components of the gravitational acceleration and of the centrifugal acceleration that extend perpendicular with respect to the vertical axis of the vehicle that can tilt about the axis of rotation are relevant. The accelerations are usually directed in directions opposite to one another. The resultant value with regard to the vehicle coordinate system is defined as the lateral acceleration of the vehicle perpendicular to its tilted vertical axis.

In accordance with the present disclosure, the angle of tilt of the vehicle or of the body to be calculated is selected such that a value of zero is produced for the lateral acceleration perpendicular to the vertical axis (of the vehicle coordinate system that is tilted with respect to the global coordinate system). In the case of a tilting vehicle that comprises an axis of rotation that is lying close to the ground along which the vehicle is to travel, equilibrium of moments about this axis of rotation is achieved in this manner.

The respective angle of tilt "φ" can be calculated approximately as follows:

$$\varphi = \arctan(a_y/g),$$

wherein "$a_y$" represents the centrifugal acceleration and "g" represents the gravitational acceleration with respect to the global coordinate system.

When setting the angle of tilt that has been calculated in this manner, the value of the lateral acceleration perpendicular to the vertical axis of the tilted vehicle is equal to zero. This means that, in the case of an angle of tilt of the vehicle that has been assumed in this manner, as the vehicle negotiates a curve, there is no moment about the axis of rotation.

Against this background, it is further proposed that the actuator can be deactivated in the state of this equilibrium. This means that the adjusting force that is generated by the actuator can be switched off at least in part, and in some cases completely, once the calculated angle of tilt has been set. Since the vehicle is in a state of equilibrium with respect to any force moments about the axis of rotation and is thus stable after the calculated angle of inclination has been achieved, there is in this respect no longer the need to maintain the adjusting force on the part of the actuator. Accordingly, the prevailing tilt of the vehicle is at least temporarily automatically maintained without it requiring an activity on the part of the actuator.

The advantage that arises from this resides initially in a quite simple and consequently cost-effective option for open-loop and closed-loop control of the tilt running gear. Due to the few requirements for a detection means, it is possible to select a corresponding cost-effective sensor configuration. An overall simplified and more rapid control of the angle of tilt is rendered possible in the case of simultaneous control loop stability by virtue of dispensing with conversions that occasionally require costly and corresponding processing power, the conversions being performed between the global coordinate system and the vehicle coordinate system. It is possible for this purpose to use, for example, a PID controller.

The approach in accordance with the present teachings can, therefore, render it possible to control the vehicle fundamentally in one position in which a stationary adjusting force by means of the actuator is not required. This approach can also be referred to as "inverse pendulum control."

An advantage of the disclosed method is the option of deactivating the actuator during stable driving states. High energy consumption can be attributed at least in part to a stationary adjusting force being provided by means of the actuator, for example in the form of a stationary supporting moment during steady-state cornering situations. Mechanical friction between different parts that can be displaced relative to one another in the case of an angle of tilt of the vehicle can also contribute to energy use. In addition to the optimization process, there is a high potential for energy savings due to the ability to switch off the actuator at least temporarily.

In one exemplary embodiment, the actuator is an electric motor. As an alternative to this, the actuator can also comprise at least one electric motor. The electric motor is provided for accelerating the vehicle or its body about the axis of rotation in order to assume the desired angle of tilt. In addition, the electric motor also may be used to correspondingly decelerate and/or brake the acceleration that has already been performed about the axis of rotation.

With regard to the arrangement of the electric motor, the electric motor also may be used as a consumer and/or as a generator of electrical energy. It is possible to use for this purpose the kinetic energy that is available during the tilt about the axis of rotation, in particular during the reduction of the acceleration. Thus, the kinetic energy can be transferred from the rotation to the electric motor that is set into rotation as a result. This rotation can be used in turn in order reclaim electrical energy via the electric motor that is thus rotating in a passive manner. The electric motor can be used both for the active acceleration and also for reclaiming electrical energy. In the case of the electrical energy being reclaimed by means of the electric motor, the electric motor simultaneously generates a resistance, by means of which the desired reduction of the previous acceleration about the axis of rotation is performed.

In this respect, the electric motor is able to provide the necessary kinetic energy as the adjusting force for the angle of tilt during the rotating acceleration as well as claim back the kinetic energy from the deceleration or braking operation of the rotation within the possible angle of tilt. This electrical energy that has been obtained (reclaimed) in this manner can then be accumulated in a suitable manner, for example, by way of an accumulator. Although different energy losses are unavoidable during the operation of the tilting running gear, the overall energy consumption can be further reduced in this manner.

Dimensioning of the actuator should take into account the maximum required adjusting force. The actuator should be able to make the vehicle reach required leaning angles and leaning angular velocities necessary in an evasive maneuver, even if additional forces are required due to vehicle occupants increasing overall vehicle mass. Another dimensioning criterion to be taken into account is the force required to upright the vehicle from fully leaned position when it is standing still. Additional influencing factors for establishing the adjusting force that can be generated are the maximum possible centrifugal acceleration and/or the structurally maximal possible angle of tilt and/or the required dynamics for accelerating about the axis of rotation with respect to the angle of tilt.

In accordance with the present teachings, a braking device is provided and the decelerating power and/or braking power of the braking device acts upon the rotation of the vehicle or its body about the axis of rotation. In other words, due to the fact that an advantageous braking device of this type is provided, the vehicle is prevented, at least in part, from tilting about the axis of rotation when the braking device is actuated at least in part. In this manner, it is possible, for example, to expediently decelerate an excessively rapid shift between different angles of tilt.

In accordance with one aspect of the present disclosure, a 'feed-back' closed loop control can be provided. This means that the angle of tilt of the vehicle is controlled along the previously set equilibrium as soon as the centrifugal acceleration $a_y$ in the global coordinate system changes. In other words, a new angle of tilt that is required in order to maintain the value of zero for the lateral acceleration is calculated in the case of a change in the centrifugal acceleration. Consequently, the lateral acceleration with regard to the vehicle coordinate system is used as a control input for the 'feedback' closed loop control.

Possible triggers for the change in the centrifugal acceleration may include, for example, acceleration processes or braking operations of the vehicle and a change in the curve radius and, consequently, a change in the steering angle.

The newly calculated angle of tilt can be set, at least in part, by activating the actuator to generate an adjusting force that is required for this purpose. A specific magnitude of energy is required in order to accelerate the vehicle or its body about the axis of tilt. The same applies for a possible reduction of the acceleration by means of the actuator so that the displacement process can be terminated in the required angle of tilt.

As an alternative, a 'feed-forward' open loop control can be provided. This means that it is initially possible to predict a driving situation that renders it possible to anticipate a specific centrifugal acceleration. Subsequently, it is possible in advance of an actually occurring driving situation to pre-calculate and set an ideal angle of tilt that is to be assumed due to the anticipated centrifugal acceleration. Subsequently, it is possible to perform the actual control towards this pre-calculated ideal angle of tilt. It is possible for this purpose to calculate a new angle of tilt on the basis of a possible deviation between the pre-calculated ideal angle of tilt and the angle of tilt that is currently required due to the prevailing driving situation. This can be set, at least in part, by activating the actuator to generate an adjusting force that is required.

Additionally or alternatively, the previously described approaches for operating the tilting running gear in the form of a 'feed-back' closed loop control or a 'feed-forward' open loop control can be combined with one another. The combination may be dependent upon the respective driving situations. Furthermore, the mixture of the two approaches can be performed by way of the weighting factors. The weighting factors concerned can be fixed values. The weighting factors can vary, for example, in dependence upon the respective driving conditions.

Depending upon the magnitude of the detected centrifugal acceleration, it is feasible that a required angle of tilt for the vehicle is calculated that exceeds the maximal structural angle of tilt. In such a case, it is possible to maintain the previously set maximal possible angle of tilt in that the actuator is activated in order to generate an adjusting force that is necessary for this purpose. A measure of this type is regarded as advantageous for a short period of time. In contrast thereto, the present disclosure provides other solutions for conditions of this type where it is necessary to continuously maintain the maximal possible angle of tilt and the solutions can be used accordingly.

With regard to the arrangement of the braking device, it is provided to use the braking device to actually lock the currently set angle of tilt. Fundamentally, the actuator can always be deactivated if the braking device assumes the function of locking the vehicle or its body in the respective prevailing position about the axis of rotation.

Thus, the locking process can be performed, for example, in the case of low velocities (for example <5 km/h) and/or small steering angles while the vehicle is located in its upright position. When the vehicle is in the upright position, the vertical axis of the global coordinate system and of the vehicle coordinate system accordingly lie one over the other or extend at least in parallel. In other words, the vehicle can thus be locked in its upright position by means of the braking device until a value is achieved for the centrifugal acceleration that requires a tilt of the vehicle. In this position, the angle of tilt has a corresponding value of zero.

It is possible to achieve an occasionally high saving in energy by deactivating the actuator and, also, the entire open loop tilt control in a simultaneous or time-offset manner. Depending upon the embodiment of the braking device, its consumption of energy is then below the potential savings that is possible in this manner.

The vehicle can be locked in its tilt position with a prevailing angle of tilt not equal to zero by actuating the braking device for a period of time until an adjustment of the prevailing angle is required. Since the prevailing angle of tilt is maintained in a tilted position by the locking process (by way of the braking device), it is also possible during this phase to deactivate the actuator.

In accordance with another aspect of the present disclosure, the braking device also can be used to lock the vehicle or its body in the maximal possible angle of tilt. Once the vehicle has achieved the structurally maximal possible angle of tilt not equal to zero, it is also possible to lock the vehicle in this position in that the braking device is actuated accordingly. The same can also apply for the case that a mathematically required angle of tilt is calculated that exceeds the maximal possible angle of tilt. The maximal possible angle of tilt is initially set in this case and subsequently locked by way of the braking device.

A constant interaction between the actuator and the braking device occurs and the actuator and the braking device alternate in their respective activity. The transfer between the two devices is then performed accordingly in order not to experience any unpleasant transitions or even transitions that endanger the operation of the vehicle.

Overall, it is to be established that the vehicle or its body can only tilt as far as a structurally fixed maximal angle of tilt. In this respect, the maximal value is also limited for the centrifugal acceleration than can be compensated for due to the angle of tilt. The maximal possible angle of tilt can be set, for example, to compensate for a maximal centrifugal acceleration of about 4.0 m/s$^2$. Depending on the maximum leaning angle allowed by design, the maximal centrifugal acceleration may range between about 3.0 m/s$^2$ and about 9.0 m/s$^2$. Above this value, a maximal possible adhesion of the wheels to the respective ground is no longer ensured.

Exemplary scenarios for the transfer process between the actuator and the braking device in accordance with the present teachings are described in detail below:

In a case in which the maximal centrifugal acceleration that can be compensated for and the maximal achievable angle of tilt are mathematically exceeded, the braking device can be actuated during a constant value for the angle of tilt. As a result, the vehicle is locked in its prevailing angle of tilt.

As soon as the braking device is activated and the vehicle is locked, the actuator can be slowed down accordingly and/or can run out with respect to its previously generated adjusting force.

If it is detected that the centrifugal acceleration has reduced and its prevailing value is moving towards the maximal centrifugal acceleration that can be compensated for, the actuator can be re-activated. In this state, the actuator is in a type of ready state while the braking device still continues to be active.

If the detected value for the prevailing centrifugal acceleration drops below the value for the maximal centrifugal acceleration that can be compensated for and if it is possible to calculate for the required angle of tilt a value that lies below the set maximal angle of tilt, the braking device can be deactivated and consequently released. Accordingly, the actuator that is already in a ready state assumes the position corresponding to the newly calculated angle of tilt.

Subsequently, the standard operation for the tilting running gear is performed again wherein the value for the lateral acceleration is maintained at zero in a perpendicular manner with respect to the vehicle vertical axis.

The method described herein for operating an active tilting running gear renders possible an extremely simple and consequently cost-effective open loop control and closed loop control of the active tilting running gear. As a result of the simple control procedures, costly open loop control procedures are not necessary, such that it is sufficient for the method to process only a small amount of data relating to the prevailing vehicle dynamics. In particular, the use of an additional braking device for locking the prevailing angle of tilt relieves the load on the actuator to such an extent that the actuator can be used in an extremely energy efficient manner.

In this case, it is the interaction between the actuator and the braking device that reduces to a minimum the amount of energy consumed by the actuator during operation, reducing the conventional continual running of the actuator. The actuator is thus activated for the at least in part setting of the respective required angle of tilt, whereas a stationary angle of tilt is maintained by way of the braking device performing a locking process. At all events, the actuator is also used for short periods of time to maintain the prevailing angle of tilt in which it would not appear to be expedient to activate the braking device. Moreover, by using the kinetic energy that is acting upon the actuator, it is possible to reclaim electrical energy, as a consequence of which the energy consumption can be considerably reduced overall.

The method in accordance with the present disclosure relates to a tilting running gear for a non-rail-borne vehicle having at least one actuator that can comprise at least three gear wheels. The tilting running gear in accordance with the present teachings can be used to implement the previously described method.

An angle of tilt of the vehicle that is required in a curve due to the centrifugal acceleration can be set with respect to a global coordinate system about an axis of rotation at least in part by means of an adjusting force that can be generated by the actuator.

In accordance with the present teachings, the angle of tilt can be calculated based on the prevailing values of the centrifugal acceleration and of the gravitational acceleration in such a manner that a resultant value of a lateral acceleration with regard to a vehicle coordinate system that is tilted with respect to the global coordinate system about the angle of tilt is equal to zero. In one exemplary embodiment, the actuator is an electric motor. Alternatively, the actuator can comprise at least one electric motor. The electric motor is provided for the purpose of accelerating and/or decelerating the vehicle in order to set the angle of tilt about the axis of rotation. Furthermore, the electric motor uses the kinetic energy that is available during the deceleration of the tilting process in order to generate electrical energy. In addition, a braking device is provided and the vehicle is prevented at least in part from tilting about the axis of rotation by the braking device being actuated at least in part. Furthermore, the actuator can be deactivated once the calculated angle of tilt has been set.

Turning now to the drawings, FIG. 1 is a schematic representation of a non-rail-borne vehicle 1 having an active tilting running gear 2 in accordance with the present teachings. The tilting running gear 2 comprises an actuator (not shown). The vehicle 1 is located within a global coordinate system x, y, z. As is evident, the vehicle 1 tilts with respect to the global coordinate system x, y, z, so that a vehicle vertical axis z' of a vehicle coordinate system x', y', z' and a vertical axis x of the global system include between themselves an angle of tilt φ.

In the front or rear view in this illustration, the viewing direction is in the direction of a global longitudinal axis x or a vehicle longitudinal axis x' of the vehicle 1. In this view, a horizontal ground 3 extends in a global transverse direction x of the global coordinate system x, y, z. The vehicle 1 having two wheels 5, 6 that are arranged on a common vehicle axle 4 is standing on the ground 3. The two wheels 5, 6 are spaced apart from one another with respect to their respective standing plane on the ground 3 in parallel to the global transverse axis x. Each of the wheels 5, 6 is a component part of a suspension side 7, 8 of the multi-track vehicle axle 4.

A body 9 of the vehicle 1 is evident between the left-hand wheel 5 lying on the left-hand side in FIG. 1 and the right-hand wheel 6 lying accordingly on the right-hand side in FIG. 1. The body 9 is illustrated tilted towards the right about the angle of tilt φ. The person who is generally controlling the vehicle 1 is located in or on the body, the person is not further illustrated in the figure. A center of gravity S is indicated in the middle of the body 9. The center of gravity S can be the center of gravity of the vehicle 1 alone or the center of gravity S of the vehicle 1 in combination with the person or persons in the vehicle/controlling the vehicle.

An axis of rotation P that extends in parallel to the global longitudinal axis x or the vehicle longitudinal axis x' is evident at the level of the ground 3 and the vehicle 1 or its body 9 is tilted about the axis of rotation P. FIG. 1 illustrates the vehicle 1 during travel in which the vehicle is negotiating a curve (not shown). The vehicle 1 is illustrated tilted into the curve so that a centrifugal acceleration $a_y$ that acts on the vehicle 1 or on its body 9 is produced in the direction of the global transverse axis y. The centrifugal acceleration $a_y$ influences the vehicle 1 in such a manner that the vehicle is tilted out of the curve (not illustrated). In contrast thereto, a gravitational acceleration g influences the vehicle 1 and the gravitational acceleration is directed in parallel to the global vertical axis z towards the ground 3.

The components of the centrifugal acceleration $a_y$ that extend in each case in parallel to the vehicle transverse axis x' and the gravitational acceleration g are combined to form a resultant lateral acceleration $a_y'$ that is directed in a perpendicular manner with respect to the vehicle vertical axis z'.

The centrifugal acceleration $a_y$ that acts on the vehicle 1 as a curve is being negotiated causes the vehicle to tilt in a suitable angle of tilt φ about the axis of rotation P. For this purpose, the vehicle 1 is tilted with its vehicle vertical axis z' with respect to the global vertical axis z into the curve. The tilting process is performed actively, wherein this process is performed at least in part by means of the actuator (not shown) that generates a corresponding adjusting force for this purpose.

According to the method in accordance with the present teachings for operating the tilting running gear 2, the angle of tilt φ is calculated on the basis of prevailing values of the centrifugal acceleration $a_y$ and the gravitational acceleration g. As already previously explained, the values that are relevant for this purpose are those values that are combined in the resultant lateral acceleration $a_y'$ and that can generate as a tilt about the axis of rotation P. The closed loop control provides that the respective resultant value of the lateral acceleration $a_y'$ with regard to the vehicle coordinate system x', y', z' that is tilted in the curve with respect to the global coordinate system x, y, z about the angle of tilt φ is equal to zero. In other words, the angle of tilt φ is determined in such a manner that a lateral acceleration $a_y'$ is not produced from the centrifugal acceleration $a_y$ and the gravitational acceleration g.

In accordance with the present teachings, the actuator is deactivated once the vehicle has successfully reached the calculated setpoint angle of tilt φ has been successfully set, since the vehicle is at least temporarily in equilibrium. It is possible in this manner to achieve an occasionally high savings of electrical energy.

Figure 2:
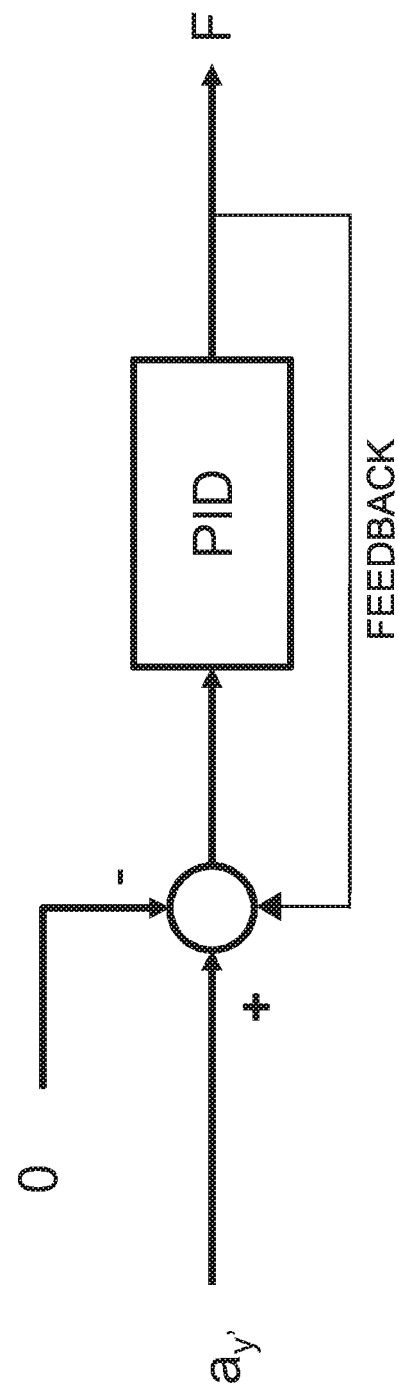
FIG. 2 illustrates a structure of a control process for the tilting running gear shown in FIG. 1 in the form of a 'feed-back' closed loop control.

FIG. 2 is a schematic representation for a 'feed-back' closed loop control. This comprises a "proportional-integral-derivative controller" that is also known as a PID controller. The value "zero" applies as a guide variable (desired value) for the lateral acceleration $a_y'$ that extends in a perpendicular manner with respect to the vehicle high axis z' of the vehicle 1. The lateral acceleration $a_y'$ is used in this respect as a control variable (actual value) that is compared with the guide variable "zero". Any possible control deviation is directed to the PID controller that forms an adjusting variable as an adjusting force F as required. The adjusting force F can be, for example, a required tilting moment that must be generated by the actuator.

Figure 3:
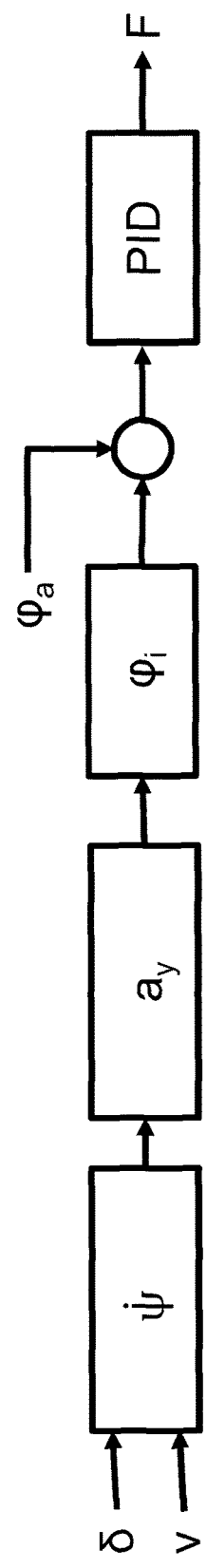
FIG. 3 illustrates a structure for a further control process for the tilting running gear shown in FIG. 1 in the form of a 'feed-forward' open loop control.

FIG. 3 is a schematic representation of a 'feed-forward' open loop control. This likewise comprises a PID controller. On the basis of the detected data relating to the driving dynamics such as, for example, the velocity v of the vehicle, the steering angle δ, and the current leaning angle φ, an expected driving state ψ is predicted. An anticipated centrifugal acceleration $a_y$ is assumed from this, the anticipated centrifugal acceleration being used as a basis for pre-calculating an ideal angle of tilt $φ_i$ that is to be assumed. The currently detected angle of tilt $φ_a$ is used as a guide variable (desired value). The ideal angle of tilt $φ_i$ is used in this respect as a control variable (actual value) that is compared with the currently detected angle of tilt $φ_a$ as a guide variable. Any possible control deviation is directed to the PID controller that forms an adjusting variable as an adjusting force F as required. The adjusting force F can be, for example, a required tilting moment that must be generated by the actuator.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method of operating a tilting running gear for a non-rail-borne vehicle having at least one actuator, comprising:
   calculating, via a controller, an angle of tilt of the vehicle around an axis of rotation based on measured values of centrifugal acceleration and gravitational acceleration as the vehicle enters a curve;
   accelerating or decelerating a tilt of the vehicle that is provided by the tilting running gear to achieve the calculated angle of tilt, wherein the acceleration or deceleration of the tilt is based at least in part on a comparison between an actual lateral acceleration of the vehicle and a desired lateral acceleration of the vehicle; and
   deactivating the actuator via the controller when the calculated angle of tilt has been achieved,
   wherein the actuator provides acceleration of the tilt and the braking device provides deceleration of the tilt.

2. The method as claimed in claim 1, wherein the actuator is an electric motor that also provides deceleration of the tilt of the vehicle, the method further comprising converting kinetic energy available during the deceleration provided by the electric motor to electrical energy with the electric motor.

3. The method as claimed in claim 1, wherein the comparison between the actual lateral acceleration of the vehicle and the desired lateral acceleration of the vehicle is controlled by a 'feed-back' closed loop control.

4. The method as claimed in claim 3, further comprising calculating a new angle of tilt when a change in the centrifugal acceleration is determined.

5. The method as claimed in claim 4, further comprising activating the actuator in order to generate an adjusting force to achieve the new angle of tilt.

6. The method as claimed in claim 1, further comprising calculating a new angle of tilt based on a comparison between an ideal angle of tilt and a current angle of tilt.

7. The method as claimed in claim 6, wherein the comparison between the ideal angle of tilt and the current angle of tilt is controlled by a 'feed-forward' open loop control based on a predicted driving situation.

8. The method as claimed in claim 7, further comprising activating the actuator in order to generate an adjusting force to achieve the new angle of tilt.

9. The method as claimed in claim 4, further comprising, when the calculated new angle of tilt exceeds a preset maximal possible angle of tilt of the vehicle, maintaining the vehicle in the preset maximal possible angle of tilt via the braking device.

10. The method as claimed in claim 9, further comprising activating the actuator in order to generate an adjusting force to achieve the preset maximal possible angle of tilt.

11. The method as claimed in claim 4, further comprising locking the vehicle in an upright position via the braking device until a change in the centrifugal acceleration that requires the vehicle to tilt is determined.

12. The method as claimed in claim 11, wherein than angle of tilt is zero when the vehicle is locked in its upright position with a value of zero for the angle of tilt.

13. The method as claimed in claim 12, further comprising deactivating the actuator while the angle of tilt is locked.

14. The method as claimed in claim 3, further comprising controlling the comparison between the actual lateral acceleration of the vehicle and the desired lateral acceleration of the vehicle with a proportional-integral-derivative controller.

15. The method as claimed in claim 5, wherein activating the actuator in order to generate the adjusting force comprises activating the actuator to generate a required tilting moment to achieve the new angle of tilt.

16. A non-rail-borne vehicle, comprising:
   a tilting running gear configured to tilt the vehicle;
   a controller configured to calculate an angle of tilt of the vehicle around an axis of rotation based on measured values of centrifugal acceleration and gravitational acceleration as the vehicle enters a curve;
   an actuator configured to accelerate the tilt of the vehicle; and
   a braking device configured to decelerate the tilt of the vehicle,
   wherein the controller is configured to activate the actuator or the braking device to achieve the calculated angle of tilt, and
   wherein the acceleration or deceleration of the tilt is based at least in part on a comparison between an actual lateral acceleration of the vehicle and a desired lateral acceleration of the vehicle.

17. The vehicle as claimed in claim 16, wherein the actuator is an electric motor that is also configured to decelerate the tilt of the vehicle.

18. The vehicle as claimed in claim 1, wherein the comparison between the actual lateral acceleration of the vehicle and the desired lateral acceleration of the vehicle is controlled by a 'feed-back' closed loop control.

* * * * *